(No Model.)
G. HARMELINK.
CONTROLLING LEVER AND GRIP.
No. 587,732. Patented Aug. 10, 1897.
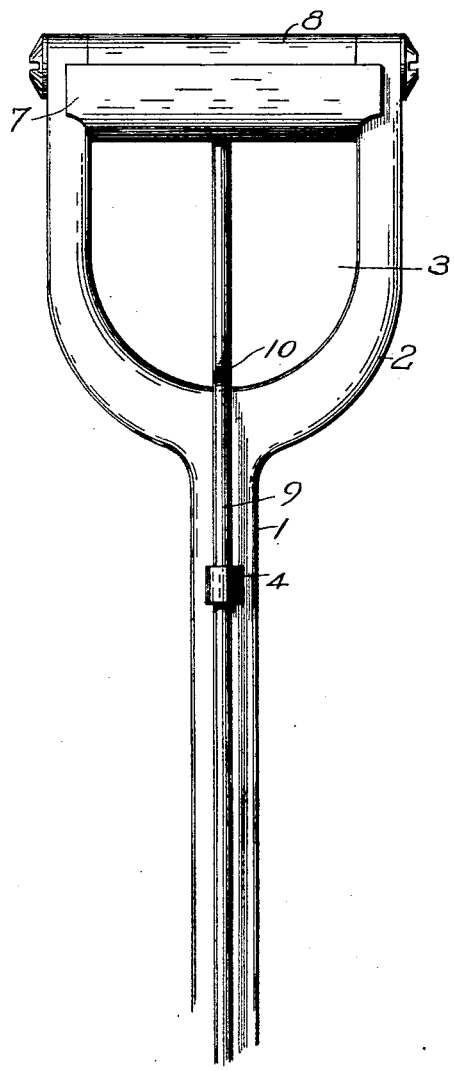
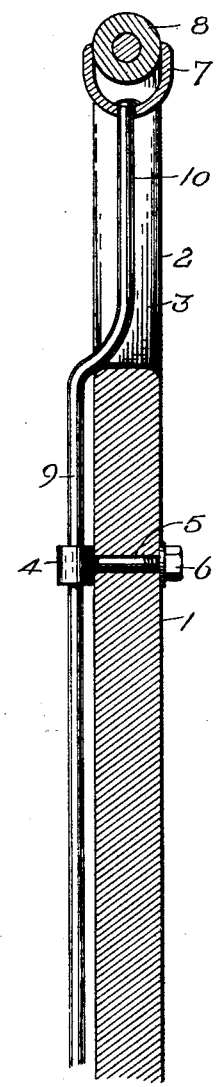
WITNESSES
James F. Duhamel
George A. Byrne
INVENTOR,
Gerrit Harmelink.
by John Wedderburn
Attorney

UNITED STATES PATENT OFFICE.

GERRIT HARMELINK, OF NEWKIRK, IOWA.

CONTROLLING-LEVER AND GRIP.

SPECIFICATION forming part of Letters Patent No. 587,732, dated August 10, 1897.

Application filed November 23, 1896. Serial No. 613,196. (No model.)

*To all whom it may concern:*

Be it known that I, GERRIT HARMELINK, a citizen of the United States, residing at Newkirk, in the county of Sioux and State of Iowa, have invented certain new and useful Improvements in Controlling-Levers and Grips; and I do hereby declare the following to be a full, clear, and exact description of the invention, such as will enable others skilled in the art to which it appertains to make and use the same.

My invention relates to controlling-levers and grips therefor.

Heretofore pivoted grips and ordinary straight lever-handles have been commonly employed. In many kinds of machines, and particularly in harvesters, where the lever of this class is employed to raise and lower the machine-frame, the operator cannot manipulate the lever to the best advantage while sitting down, as it is necessary to partially twist the hand and forearm.

My object is to provide a controlling-lever handle of improved construction and a novel form of grip especially adapted for use in connection therewith, whereby the lever and grip can be more easily and satisfactorily operated than has heretofore been possible.

Having this object in view, the invention consists of a controlling-lever provided with an open handle and a grip of improved construction movable in the opening, said parts being so arranged that a direct pull can be exerted on the lever without twisting the wrist or forearm of the operator.

The invention will be more fully pointed out in the following description and appended claim.

In the accompanying drawings, Figure 1 is a side elevation of my improved lever and the grip, and Fig. 2 a longitudinal section.

The lever proper is designated by the numeral 1. This lever is provided with an enlarged upper end 2, having a substantially square-shaped opening 3.

The numeral 4 designates a guide which has a screw-threaded shank 5, which passes through the handle, and 6 designates a nut adapted for securing the guide in position.

It will be seen that the portions of the open handle are rounded similarly to a spade-handle. My improved grip is designated by the numeral 7, and it consists of a piece which fits in the opening of the handle, being substantially U-shaped in cross-section, so that it will properly embrace the upper cross-piece 8 of the handle. The ends of the grip receive and slide on the sides of the handle. The pull-rod that operates the usual spring-pressed pawl is designated by the numeral 9. Said pull-rod works through the guide 4 and is formed into a bent portion 10, which is passed through the hollowed portion of the grip. It will also be seen that the arm of the operator can be held perfectly straight when grasping the grip and handle and operating the lever. The lever can be used in connection with any kind of machinery or device to which it is adapted.

Having thus described my invention, what I claim as new, and desire to secure by Letters Patent, is—

The combination with a controlling-lever having an open spade-handle provided with the usual cross-piece, of a grip located in the opening of the handle and which grip is substantially U-shaped in cross-section, the same loosely embracing the cross-piece of the handle so as to be adapted to slide thereon and provided with notched ends which loosely receive the said pieces of the handle.

In testimony whereof I have signed this specification in the presence of two subscribing witnesses.

GERRIT HARMELINK.

Witnesses:
S. L. OLMSTED,
W. F. RIECKHOFF.